United States Patent
De Domenico et al.

(10) Patent No.: US 8,929,296 B2
(45) Date of Patent: Jan. 6, 2015

(54) DYNAMIC MANAGEMENT OF SMALL CELLS FOR TRAFFIC-RELATED OPTIMIZATION OF THE ENERGY CONSUMPTION OF A NETWORK

(71) Applicant: Commissariat a l'Energie Atomique et aux Energies Alternatives, Paris (FR)

(72) Inventors: Antonio De Domenico, Frosinone (IT); Rohit Gupta, Grenoble (FR); Emilio Calvanese Strinati, Grenoble (FR)

(73) Assignee: Commissariat à l'Energie Atomique et aux Energies Alternatives (FR)

(*) Notice: Subject to any disclaimer, the term of this patent is extended or adjusted under 35 U.S.C. 154(b) by 157 days.

(21) Appl. No.: 13/762,599

(22) Filed: Feb. 8, 2013

(65) Prior Publication Data

US 2013/0201943 A1 Aug. 8, 2013
US 2014/0098750 A2 Apr. 10, 2014

(30) Foreign Application Priority Data

Feb. 8, 2012 (FR) ...................................... 12 51166

(51) Int. Cl.
| | | |
|---|---|---|
| H04W 4/00 | (2009.01) | |
| H04W 28/02 | (2009.01) | |
| H04W 52/02 | (2009.01) | |
| H04L 12/833 | (2013.01) | |
| H04W 72/12 | (2009.01) | |
| H04W 84/04 | (2009.01) | |

(52) U.S. Cl.
CPC ...... *H04W 28/0268* (2013.01); *H04W 52/0206* (2013.01); *H04L 47/2458* (2013.01); *H04W 72/1242* (2013.01); *H04W 84/045* (2013.01)
USPC ............................. 370/328; 455/446; 455/450

(58) Field of Classification Search
None
See application file for complete search history.

(56) References Cited

U.S. PATENT DOCUMENTS

| | | | |
|---|---|---|---|
| 2004/0002341 A1 | 1/2004 | Chen | |
| 2009/0286544 A1* | 11/2009 | Huber et al. | 455/450 |
| 2009/0288139 A1* | 11/2009 | Huber et al. | 726/2 |
| 2009/0298475 A1* | 12/2009 | Czaja et al. | 455/412.2 |
| 2010/0118844 A1* | 5/2010 | Jiao et al. | 370/338 |
| 2010/0169498 A1 | 7/2010 | Palanki et al. | |
| 2010/0285812 A1* | 11/2010 | Murakami | 455/452.1 |
| 2011/0070907 A1 | 3/2011 | Chou | |
| 2011/0244900 A1 | 10/2011 | Noh et al. | |
| 2012/0039242 A1* | 2/2012 | Alexiou et al. | 370/315 |
| 2012/0052839 A1* | 3/2012 | Hsieh et al. | 455/411 |
| 2012/0100856 A1* | 4/2012 | Ishida et al. | 455/436 |

FOREIGN PATENT DOCUMENTS

| | | |
|---|---|---|
| WO | 2004008794 A2 | 1/2004 |
| WO | 2009071693 A1 | 6/2009 |

OTHER PUBLICATIONS

French Search Report for Application No. FR1251166 dated Nov. 14, 2013.

* cited by examiner

*Primary Examiner* — Bob Phunkulh
(74) *Attorney, Agent, or Firm* — Lerner, David, Littenberg, Krumholz & Mentlik, LLP

(57) ABSTRACT

The invention concerns a method for managing a network of a plurality of small cell base stations arranged in a macro-cell and linked to a base station of the macro-cell, each small cell base station being adapted to cover a small cell of the macro-cell and to be linked via radio to at least one mobile terminal present in the small cell.

12 Claims, 4 Drawing Sheets

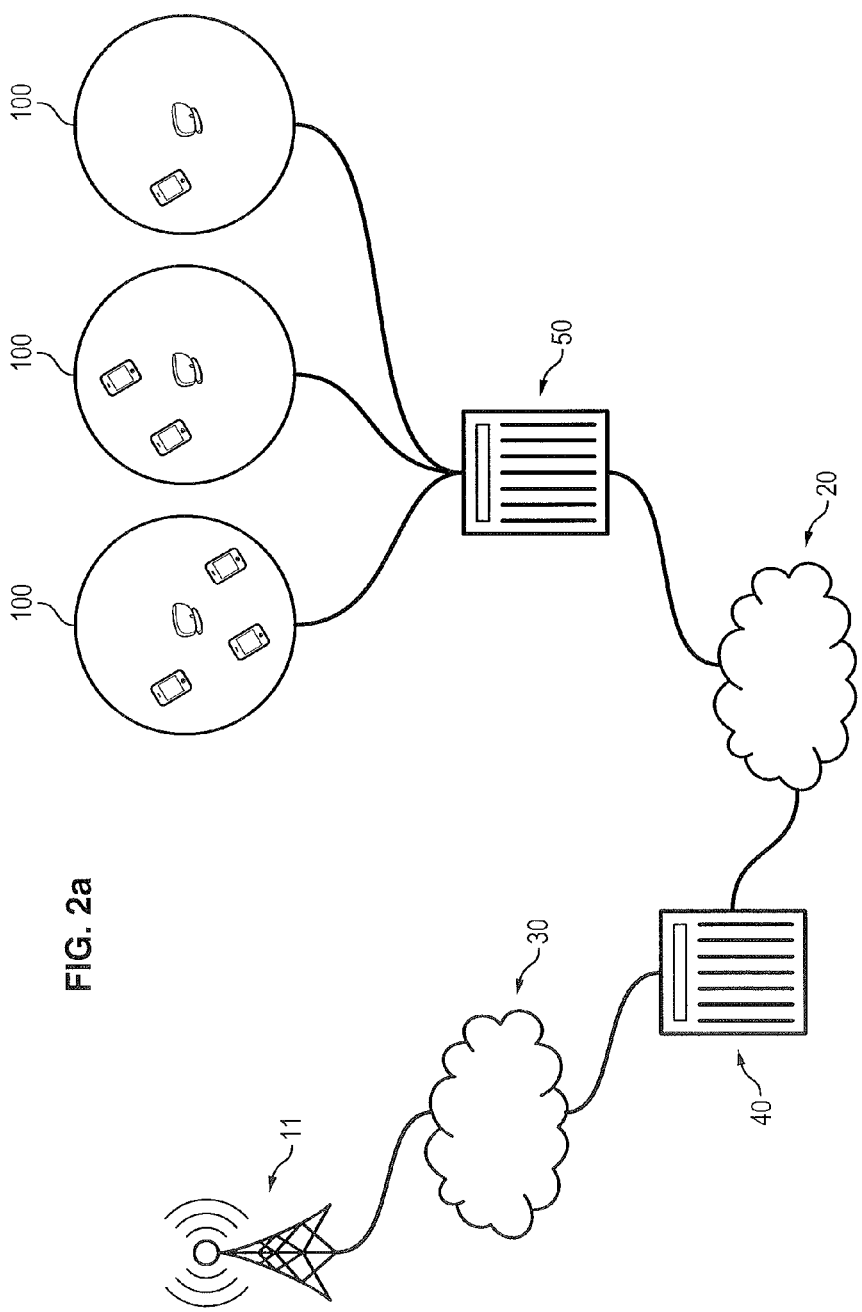

DYNAMIC MANAGEMENT OF SMALL CELLS FOR TRAFFIC-RELATED OPTIMIZATION OF THE ENERGY CONSUMPTION OF A NETWORK

CROSS-REFERENCE TO RELATED APPLICATIONS

The present application claims priority from French Application No. 1251166 filed Feb. 8, 2012, the disclosures of which are hereby incorporated herein by reference.

BACKGROUND OF THE INVENTION

The invention generally relates to the field of cell telecommunication networks and more particularly to the use of small cells.

The increasingly widespread use of terminals connected to a cell network (e.g. smartphones, computers, etc.) has caused an increase in traffic which means that cell networks are becoming more and more overloaded.

To overcome this problem, small cell networks have been proposed and deployed.

It is specified that the term small cell encompasses in order of increasing size: an attocell, femtocell, pico-cell or further a micro-cell.

A small cell comprises a small base station of low power designed to offer limited radio coverage especially dedicated to residential or in-company use. Small cells are often deployed inside buildings and are connected to an operator's network via a high-speed internet connection and are able to carry a limited number of simultaneous communications (voice or data) typically from two to eight simultaneous communications.

Small cells therefore allow improved cell coverage and improved operator network capacity within a given area.

One problem is that small cells are often deployed in chaotic manner with no real planning so that the level of interference between neighbouring cells is increased (a communication in one cell may hinder communication in the neighbouring cell).

Another problem is that said deployment reduces the energy efficiency of the network since some areas may be over-equipped with small cells, causing unnecessary energy consumption, the small cells possibly being unnecessarily activated.

Reference can be made to the document by Y. Chen, S. Zhang and S. Xu: *"Characterizing Energy Efficiency and Deployment Efficiency Relations for Green Architecture Design"*, Proc. IEEE ICC'10, Cape Town, South Africa, May 2010 which evidences such problems.

There is therefore a need for smart, dynamic activation of small cells to limit energy costs and at the same time to guarantee Quality of Service (QoS) for users.

BRIEF SUMMARY OF THE INVENTION

The invention proposes overcoming at least one of these disadvantages.

For this purpose, the invention proposes a traffic management method for a network of a plurality of small cell base stations arranged in a macro-cell in which there is at least one terminal, each small cell base station being adapted to cover a small cell of the macro-cell, the method comprising the following steps:
  determining at least one possible connection between said at least one terminal and a small cell base station;
  placing several data packets in a queue addressed to said at least one terminal, each data packet being defined by at least one level of priority;
  classifying the data packets as per their priority level;
  the method, as soon as one data packet in the queue reaches maximum priority, further comprising:
    selecting a small cell adapted to cover at least one first terminal to which said data packet having maximum priority is addressed, called the priority terminal; only said selected small cell is to be active;
    determining a group to be transmitted of at least one data packet having a lower priority level than the maximum priority level and addressed to at least one second terminal present in said activated small cell, called a non-priority terminal and/or to said priority terminal;
    connecting said priority terminal and/or said non-priority terminal to the base station of said active small cell;
    routing the data packets of said group to be transmitted towards the priority and non-priority terminals.

The invention is advantageously completed by the following characteristics taken alone or in any technically possible combination thereof:
  selection entails the implementation of the following sub-steps:
    at least one small cell is activated adapted to cover at least one priority terminal to which said data packet having a maximum priority level is addressed;
    among said at least one activated small cell at least one small cell is selected;
    the said non-selected activated small cells are deactivated.
  selection entails the implementation of the following sub-steps:
    among the said at least one activated small cell, at least one small cell is selected;
    the said selected small cell is activated.
  the priority level is a function of time length, the priority level being maximum at a threshold time after which the data packet is considered lost;
  the threshold is a function of the time needed to activate a small cell;
  the threshold is a function of the time needed to evaluate the quality of the radio link between a terminal and a small cell;
  after routing the data packets, the active small cell is deactivated;
  the small cell the closest to the said priority terminal is selected; the small cell selected is the one for which there is the best radio link between the small cell and the priority terminal.

The invention also proposes a communication network comprising a network of a plurality of small cell base stations arranged in a macro-cell in which there is at least one terminal, each small cell base station being adapted to cover a small cell of the macro-cell and to be linked via radio with said at least one terminal, the network being adapted to implement a method according to one of the preceding claims in distributed or centralized manner.

Said network may comprise a management module connected to the network of small cell base stations, the management module comprising means for storing data packets and for centralized traffic management.

Alternatively, in the network of the invention, the small cell base stations comprise means for storing data packets and to manage traffic in distributed manner.

The advantages of the invention are multiple.

With the invention, it is possible to activate dynamically only the small cell(s) needed for transmission of the data packets.

In addition, the activation period of the necessary small cell(s) is optimized.

As a result, the power needed for transmission is optimized contrary to prior art techniques in which the data packets are transmitted without any real planning. In other words, all the data packets are seen as having a maximum priority level.

The invention applies to several telecommunication systems: Long Term Evolution (LTE), Universal Mobile Telecommunication Systems (UMTS), Orthogonal Frequency Division Multiple Access (OFDMA) systems, etc.

BRIEF DESCRIPTION OF THE DRAWINGS

Other characteristics, objectives and advantages of the invention will become apparent from the following description which is solely illustrative and is non-limiting, and is to be read in connection with the appended drawings in which:

FIGS. 2a and 2b illustrate two architecture embodiments of a macro-cell conforming to the invention;

DETAILED DESCRIPTION

Figure 1:
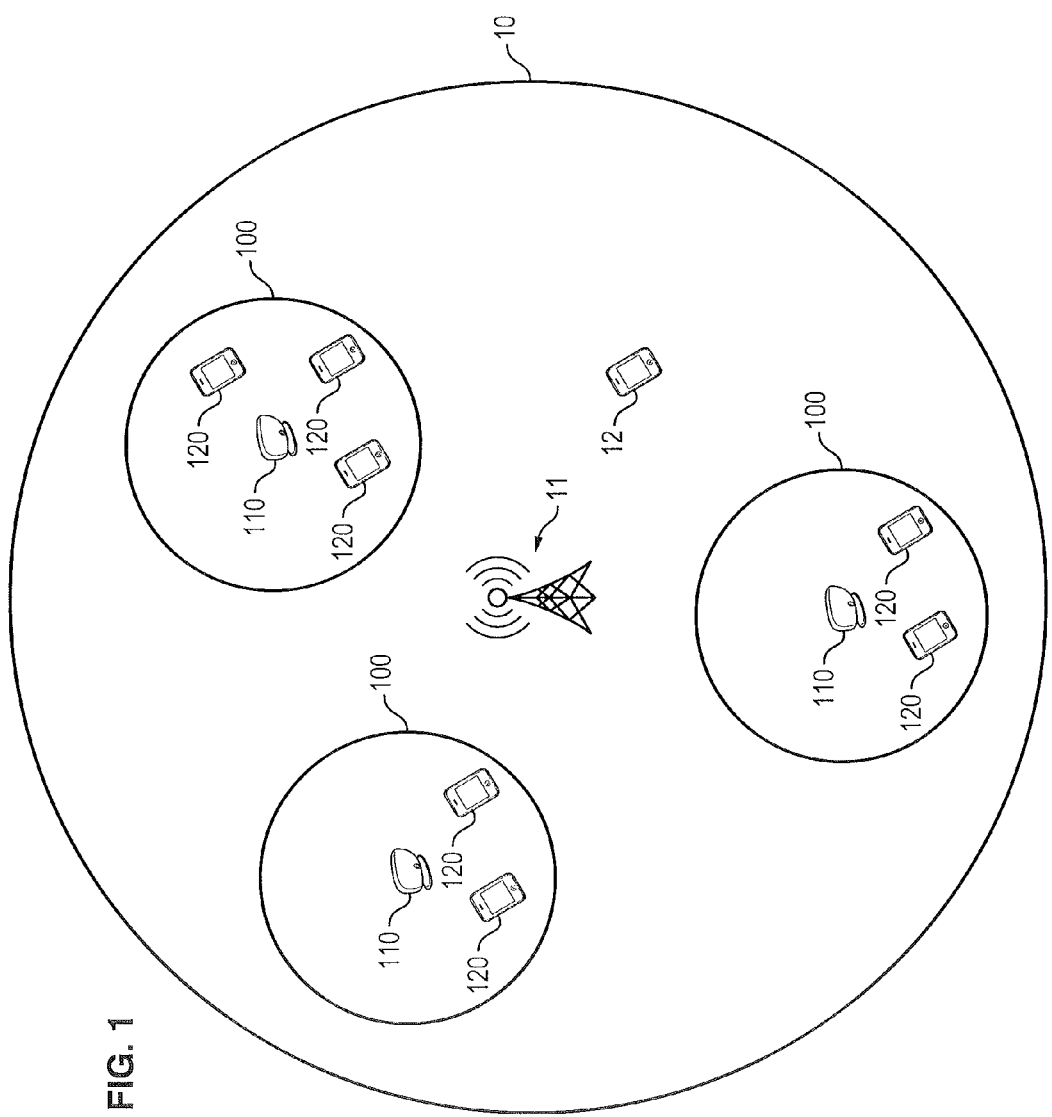
FIG. 1 illustrates a macro-cell conforming to the invention.

With reference to FIG. 1, a communication network conforming to one embodiment of the invention comprises a base station 11 controlling communications within a macro-cell 10.

Terminals 120 such as smartphones communicate with other terminals located either in the same macro-cell or in another macro-cell (not illustrated) via the base station 11. The terminals communicate either data or voice.

The macro-cell comprises a number N of small cells 100. Each small cell comprises a small cell base station 110 which controls communications in the small cell 100.

Each small cell base station is adapted so that it has a radio link with at least one mobile terminal 120 present in the small cell 100.

By radio link between a terminal and a small cell base station is meant the fact that the terminal is connected to the small cell base station so that the terminal communicates with this small cell base station.

Figure 2B:
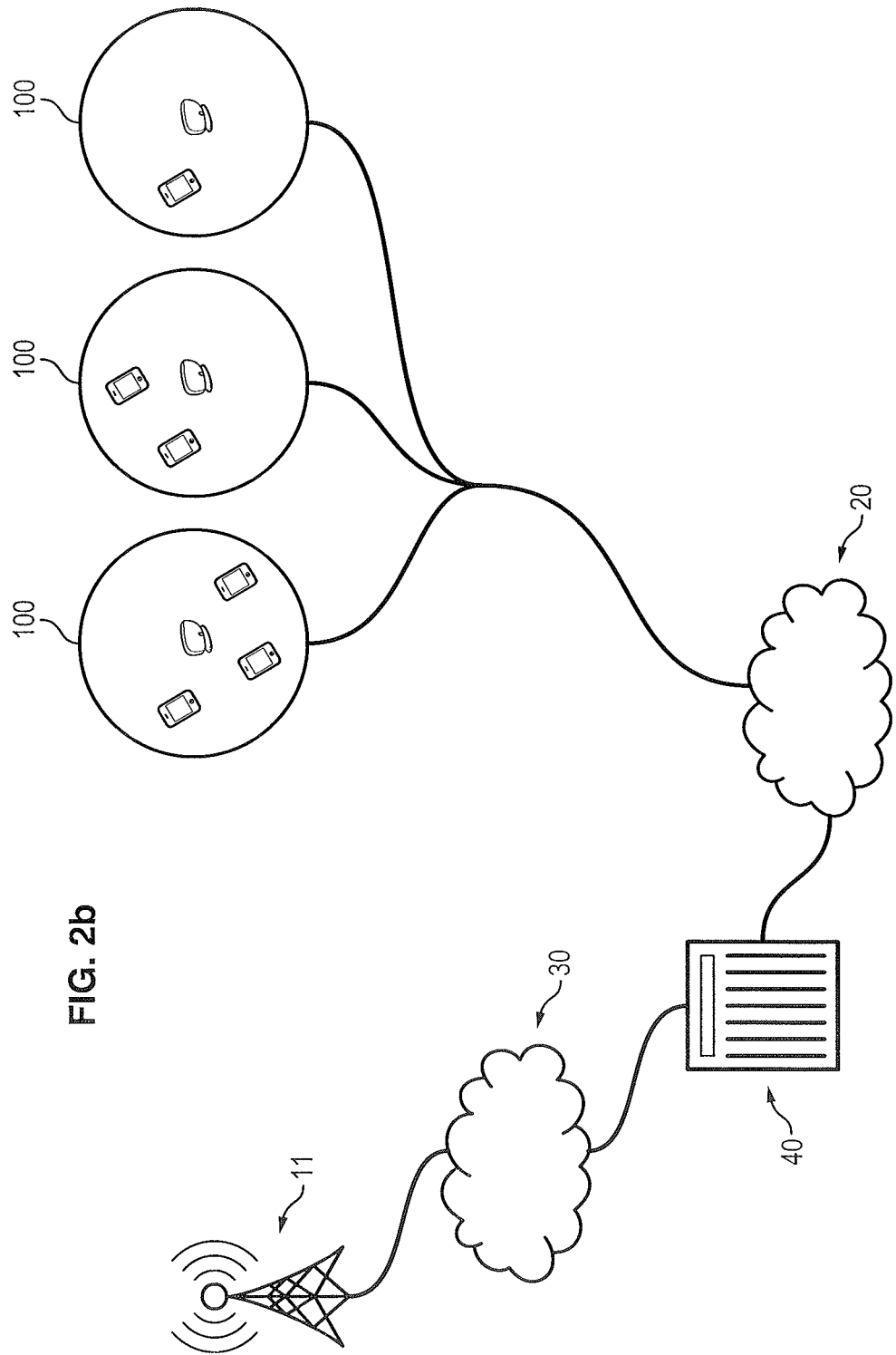

FIGS. 2a and 2b illustrate the architecture of a macro-cell 10 covered by a base station 11.

As already mentioned, the small cells 100 are connected to the network of an operator 30 via a high speed internet network 20.

The interface between the high speed internet network and the operator's network is obtained by means of a gateway 40.

The gateway 40 enables the small cell base stations 110 to communicate with the operator's network 30 transparently without having to make any changes to cell communication standards.

In addition, the gateway 40 prevents an excessive number of terminals from being directly connected to the operator's network 30.

Therefore, a terminal which is linked via radio with a small cell communicates with the operator's network via the latter.

The radio link is only possible with an active small cell i.e. the base station defining the small cell is energized.

It is specified that it is considered that the small cell may be active i.e. the small cell base station is energized, or else the small cell may be inactive i.e. the small cell base station is not energized.

Traffic management in a macro-cell comprising a network of small cell base stations can be performed in several manners.

According to one embodiment, traffic management towards the small cells is managed in centralized manner. FIG. 2a illustrates a said embodiment. According to this embodiment, the small cell base stations are managed by a management module 50 arranged between the internet network 20 and the gateway 40. The role of the management module 50 is to manage several small cells (three in FIG. 2a). Therefore, the management module 50 is connected first to the small cell base stations of the network of small cell base stations that it must manage, and secondly to the internet network 20. Said management module 50 allows management of the traffic towards the small cells, to active/deactivate the small cells in relation to traffic (see below). Therefore, the management module comprises a memory to store the traffic (i.e. one or more data packets addressed to at least one terminal).

According to another embodiment, the management of the traffic towards the small cells is managed in distributed manner. FIG. 2b illustrates a said embodiment. According to this embodiment, the small cells may activate or deactivate themselves independently in relation to traffic.

According to this management mode, all the data packets addressed to the terminals located in the small cell network are directly accessible via the small cell base stations.

There are two possible implementations of this management mode.

1) All the small cell base stations receive data packets via the cell network and they then store these data packets in a memory included in each small cell base station;
2) The data packets addressed to the terminals present in the small cell network of are stored in a memory of the gateway; the small cell base stations are then able explicitly to request the gateway to send the data packets that they must transmit.

According to another embodiment, the gateway 40 may have the logic function of controlling the small cell network, and in this case the gateway 40 is itself the management module.

Figure 3:
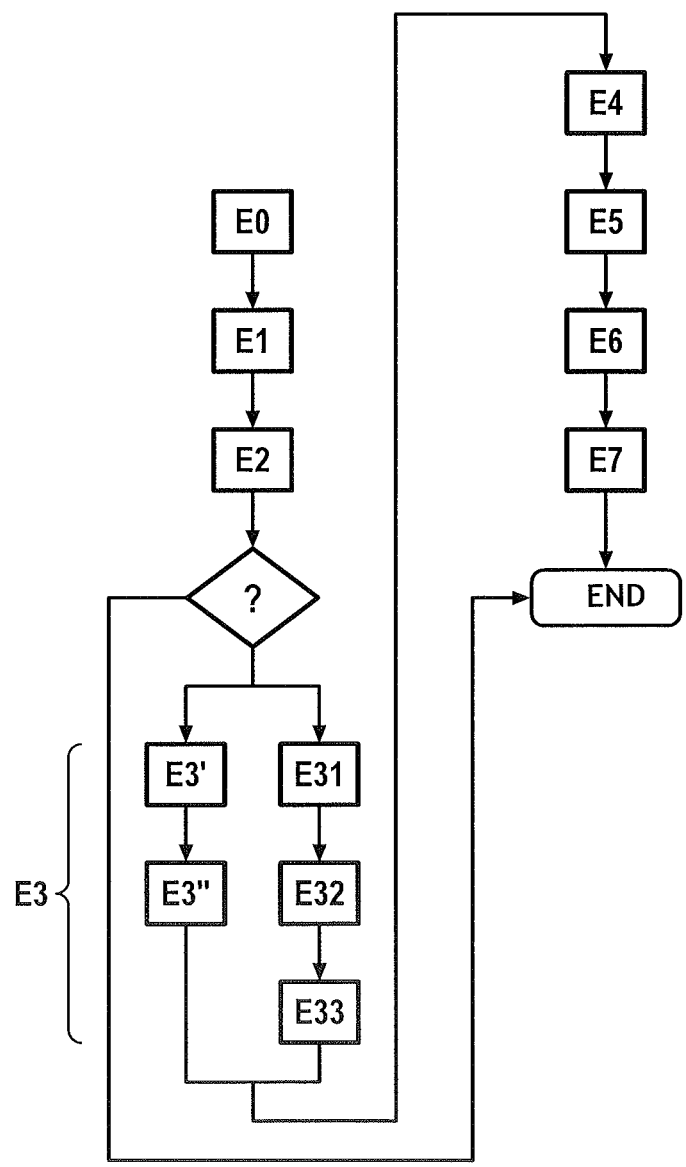
FIG. 3 illustrates steps of a method conforming to the invention.

A description will now be given of a method for managing several small cells with reference to FIG. 3. Said method can be implemented in distributed or centralized manner.

In the remainder hereof, it is considered that data packets are to be sent from the operator's network towards one or more terminals located in a network of small cell base stations (or else small cell network, the two expressions here being considered to be equivalent).

At a preliminary step E0 all the possible connections are determined between each terminal present in the network and the small cell base stations.

At this step, it is sought to determine in which small cell(s) each terminal of the small cell network is positioned.

In addition, each possible connection between a terminal and small cell base station can be defined by various metrics, such metrics able to be used during a selection step (see below).

For each terminal in the coverage area of a small cell base station, metrics may be the distance between the terminal and the small cell base station. Other metrics may concern evaluation of the radio link (power level of the signal received by the terminal of the small cell base station).

This preliminary step E0 is preferably performed periodically to manage any displacements of the terminals within the small cell network.

This preliminary step E0 can be implemented in several manners:
- each small cell base station may wake up periodically for a certain time to detect the possible presence of a terminal in its coverage area;
- a terminal may activate a small cell remotely by sending a wake-up message to which the small cell base station is sensitive;
- the management module may have knowledge of the position of the terminals relative to a small cell base station via locating data which the terminal can transmit to the management module.

As will have been appreciated, during the preliminary step E0 the small cells can be active during the time needed to locate at least one terminal in their coverage area.

Evidently once this preliminary step is completed, the small cells become inactive again.

As already mentioned, some data packets are to be transmitted to one or more terminals present in the small cell network.

It is specified that the data packets derive from the cellular network and this network knows to which small cell network of the macro-cell it must transmit the data packets (this mechanism will not be described herein).

Therefore at a step E1, several data packets addressed to at least one terminal are placed in a queue. The data packets are either placed in a queue in a memory of each small cell base station (distributed management) or in a memory of the gateway or of the management module (centralized management). It will be understood that irrespective of the traffic management mode, there is a transit area for the data packets.

For distributed management, only the data packets corresponding to a terminal present in the coverage area of the small cell under consideration are transmitted to this small cell base station to be stored therein.

The data packets may be addressed to a single terminal or to different terminals.

Placing in a queue E1 entails not transmitting a data packet immediately towards the receiver terminal.

This queuing does not cause any drop in performance level provided that the waiting time pays heed to constraints relating to Quality of Service.

Each data packet is defined by at least one priority level. This priority level is maximal for example when the data packet corresponds to real-time traffic such as voice as regards a telephone call in particular addressed to a terminal.

On the other hand, the level of priority will be minimal for data packets corresponding to emails for example.

Preferably, the priority level is a function of time length, the priority level being maximal after a certain threshold time after which the packet is considered to be lost.

Alternatively or in addition, the threshold is a function of the time needed to activate a small cell base station.

Again alternatively or in addition, the threshold is a function of the time needed to evaluate the quality of the radio link between a terminal and a small cell base station.

A data packet which is not transmitted after a certain time is eliminated by the system and will never be transmitted to a terminal. Therefore consideration must be given to the times needed for preparing transmission: power control after evaluation of radio link quality, activation time of the small cell base station. The objective is to ensure Quality of Service for users of the terminals of the small cell network.

The data packets placed in a queue are then classified E2 as per their increasing priority level.

Thereafter, as soon as a data packet in the queue reaches a maximal priority level, the following steps are carried out.

Initially, at E3 at least one small cell is selected that is adapted to cover at least one terminal which is to receive the said data packet having maximal priority level, so that only the at least one selected small cell is active. The term priority terminal will be used to define a said terminal.

This selection step E3 can be performed by comparing the various metrics obtained during the preliminary step E0.

According to one embodiment, the small cell the closest to the priority terminal is selected.

According to an additional embodiment, the small cell base station is selected which has the best radio link with the priority terminal.

For centralized management, selection entails selecting at E3' a small cell from among those possible for the priority terminal, it being the management module which makes this selection E3' having regard to the preliminary step E0 and which activates E3" the selected small cell base station.

For distributed management, selection E3 consists of implementing the following sub-steps.

Each small cell activates itself E31, then if several small cells cover the priority terminal they will each compare their above metrics to determine together at E32 which small cell provides the best metrics. The other small cells are then deactivated at E33. For this purpose, the small cell base stations are connected together via a very high speed connection (e.g. optical fibre).

At all events, as will have been understood, on completion of the process only one small cell is active to transmit a data packet having a maximal priority level.

To take advantage of the transmission of the data packet having maximal priority and of the active small cell, a group to be transmitted is determined at E4 comprising at least one data packet having a lower priority level than the maximal priority level addressed to at least one non-priority terminal present in the activated small cell and/or to the priority terminal. This step allows extraction from the queue of those data packets addressed to terminals present in the activated small cell and also extraction of those packets in the queue to be received by the priority terminal.

Next, at E5 the priority terminal and/or the non-priority terminal is connected to the activated small cell base station and at E6 the data packets are routed from the active small cell base station to the terminals concerned.

Finally, after routing E6 the data packets, the active small cell is deactivated E7.

It is to be noted that the non-transmitted data packets are held in the queue until a data packet reaches a maximal priority level.

In this manner, the method of the invention allows advantage to be drawn from the transmission of a data packet which can no longer wait for transmission to transmit to all the terminals present in the activated small cell those data packets addressed thereto.

Therefore, between two transmissions, the inactivation time lengths of the small cells are longer than would be the case with management in which a data packet addressed to a terminal is transmitted immediately.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for managing the traffic of a network of a plurality of small cell base stations arranged in a macro-cell in which there is at least one terminal, each small cell base station being adapted to cover a small cell of the macro-cell, the method comprising the following steps:
   determining at least one possible connection between said at least one terminal and a small cell base station;
   placing in a queue several data packets addressed to said at least one terminal, each data packet being defined by at least one priority level;
   classifying the data packets as per their priority level;
the method, as soon as a data packet in the queue reaches a maximal priority level, further comprising the following steps:
   selecting a small cell adapted to cover at least one first terminal to which the said data packet having a maximal priority level is addressed, called the priority terminal; only the said selected small cell to become active;
   determining a group to be transmitted of at least one data packet having a lower priority level than the maximal priority level and addressed to at least one second terminal present in said activated small cell, called the non-priority terminal, and/or addressed to said priority terminal;
   connecting said priority terminal and/or said non-priority terminal to the base station of said active small cell;
   routing the data packets of the said group to be transmitted towards the priority and non-priority terminals.

2. The method according to claim 1, wherein the selection entails implementing the following sub-steps;
   at least one small cell is activated adapted to cover at least one priority terminal to which said data packet having a maximal priority level is addressed;
   among the said at least one activated small cell at least one small cell is selected;
   the non-selected said activated small cells are deactivated.

3. The method according to claim 1 wherein the selection entails implementing of the following sub-steps:
   among the said at least one activated small cell at least one small cell is selected;
   the said selected small cell is activated.

4. The method according to claim 1 wherein the priority level is a function of time length, the priority level being maximal after a threshold time at which the data packet is considered lost.

5. The method according to claim 4 wherein the threshold is a function of the time needed to activate a small cell.

6. The method according to claim 4 wherein the threshold is a function of the time needed to evaluate the quality of the radio link between a terminal and a small cell.

7. The method according to claim 1 wherein after routing the data packets, the active small cell is deactivated.

8. The method according to claim 1 wherein the small cell the closest to the said priority terminal is selected.

9. The method according to claim 1 wherein the small cell is selected which has the best radio link between the small cell and the priority terminal.

10. A communication network comprising a network of a plurality of small cell base stations arranged in a macro-cell in which there is at least one terminal, each small cell base station being adapted to cover a small cell of the macro-cell and to be linked via radio with said at least one terminal, the network being adapted to implement a method according to claim 1 in distributed or centralized manner.

11. The communication network according to claim 10 comprising a management module connected to the network of small cell base stations, the management module comprising means for storing the data packets and for managing traffic in centralized manner.

12. The communication network according to claim 10 wherein the small cell base stations comprise means for storing the data packets and for managing traffic in distributed manner.

* * * * *